United States Patent
Koehler

(10) Patent No.: US 10,778,685 B2
(45) Date of Patent: Sep. 15, 2020

(54) PRE-USAGE AGREEMENTS

(71) Applicant: Hewlett Packard Enterprise Development LP, Houston, TX (US)

(72) Inventor: Yannick Koehler, Montreal (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 333 days.

(21) Appl. No.: 15/959,241

(22) Filed: Apr. 22, 2018

(65) Prior Publication Data

US 2019/0327232 A1    Oct. 24, 2019

(51) Int. Cl.
| | |
|---|---|
| H04L 29/06 | (2006.01) |
| H04W 60/04 | (2009.01) |
| G06Q 10/10 | (2012.01) |
| H04W 84/12 | (2009.01) |

(52) U.S. Cl.
CPC .......... *H04L 63/10* (2013.01); *H04L 63/0892* (2013.01); *H04L 63/20* (2013.01); *H04W 60/04* (2013.01); *G06Q 10/10* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,239,549 B2 | 8/2012 | Aura et al. | |
| 8,874,487 B2 | 10/2014 | Ronning et al. | |
| 9,037,118 B2 | 5/2015 | Gaddam et al. | |
| 9,615,252 B2 | 4/2017 | Bryksa et al. | |
| 2004/0082346 A1* | 4/2004 | Skytt | H04W 24/02 455/456.3 |
| 2018/0041943 A1* | 2/2018 | Visuri | H04M 15/8351 |

OTHER PUBLICATIONS

Wi-Fi Protected Access 2 (WPA 2) Configuration Example, (Research Paper), Jan. 21, 2008, 20 Pgs.

* cited by examiner

*Primary Examiner* — Joseph P Hirl
*Assistant Examiner* — Hassan Saadoun
(74) *Attorney, Agent, or Firm* — Hewlett Packard Enterprise Patent Department

(57) ABSTRACT

Examples include transmitting a frame to a computing device. The frame comprises an identifier of a pre-usage agreement for a network. Examples also include receiving a request for the pre-usage agreement, and transmitting the pre-usage agreement to the computing device. Additionally, examples include receiving a registration request comprising a calculated representation of the pre-usage agreement, validating the registration request, and transmitting a registration response.

19 Claims, 7 Drawing Sheets

PRE-USAGE AGREEMENTS

BACKGROUND

Network providers may place limits on how their networks are used. These limits may be detailed to a network user in an agreement. In some examples, the network requires that the user read and/or accept the agreement before allowing the user to access the network.

BRIEF DESCRIPTION OF THE DRAWINGS

The following detailed description references the drawings, wherein.

DETAILED DESCRIPTION

Figure 1:
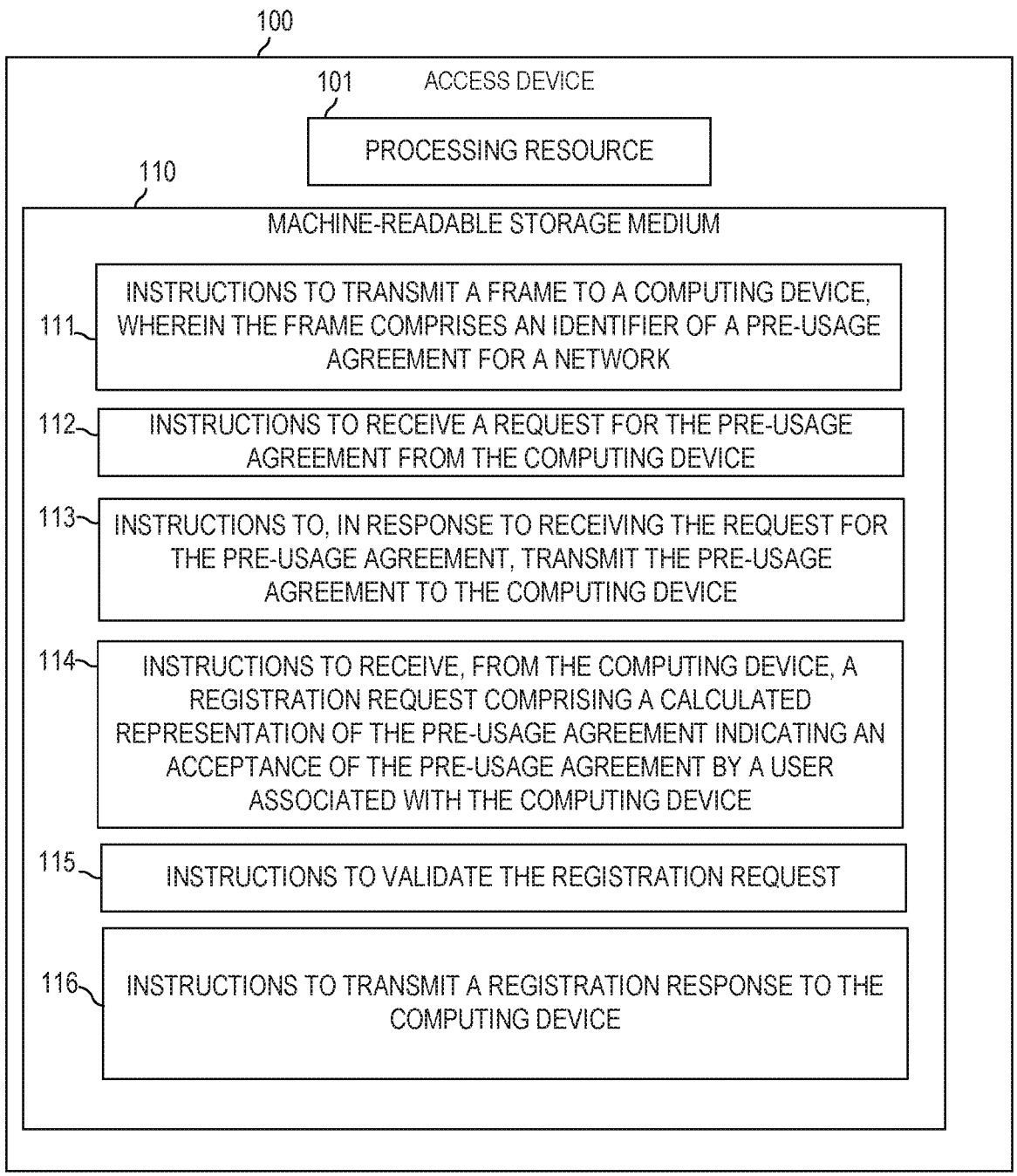
FIG. 1 is a block diagram of an access device to transmit a pre-registration agreement prior to registration of a computing device to the access device, according to some examples.

Limitations placed on network usage may vary depending on the identity of a network provider. For example, the provider may require that the user adhere to certain behaviors while using the network, or the provider may require that the user utilize the network only for specific purposes. In some examples, network usage limitations are detailed in a document (e.g., an agreement, etc.) that the user has to indicate that they have read and/or accepted. A user that does not accept the limitations is not allowed to access the network.

In some examples, client devices that wish to connect to a specific network go through initial introductory or set-up processes before connecting to the network. For example, in wireless local area (WLAN) networks using IEEE protocol (e.g., 802.11, etc.), the client device may send a Probe Request frame to see what WLAN networks are available. Access devices associated with these WLAN networks may send a Probe Response frame in response. The access device may also send a Beacon frame to advertise its network to nearby client devices. Other steps may follow, including but not limiting, to registration (e.g., association) of the client device with the access device via an Association Frame and authentication of the client device to the access device. While the specific steps may depend on the wireless protocol being used, regardless of the wireless protocol being used, these introductory steps allow client devices and computing devices to register each other's presence prior to receiving communications from each other.

Generally, the transmission of significant data (such as an agreement) does not occur until the computing device is registered (e.g., associated) with the access device. However, a client device that is already registered with a network may have free access to the network, barring any firewalls, etc. This presents a problem with networks having pre-registration agreement requirements because the user has not yet received, read, nor accepted the agreement of limitations. Thus, in some situations, an access device will allow the client device to first register with the network so that the client device may receive the agreement, but the access device will firewall the client device until the client device completes the actions required by the network provider (e.g., read, accepted, etc. the agreement). For example, after the computing device registers with the network, the traffic of the device may be re-directed to a web server to retrieve the agreement. Any attempt to navigate away will be denied until the agreement is accepted by the user.

These methods of agreement retrieval and acceptance validation are resources intensive and complex. For example, the client device needs to communicate with not only the access device but also with the server that hosts the agreement, relying on multiple communications between multiple devices. The access device also needs to implement a firewall. Often times, while the client device is registered but firewalled, the client device may believe that it is connected to the network. Thus, background applications may unsuccessfully begin functionalities requiring a network connection (e.g., updates, etc.). Additionally, this "connected" indication may mislead users into thinking that they are free to use the network while in actuality they are not (e.g., a user may move away from the application that is being used to access the agreement, etc.)

The present disclosure addresses these issues by providing a way for agreements to be received, accepted, and validated before the client device registers with the network. In some examples, the access device may transmit a frame to a computing device. This frame is introductory and serves to let the client device know what type of network it is. Along with information about the network, the frame comprises an identifier for the pre-usage agreement of the network. In some examples, the frame also comprises an indicator that this network requires the reading and/or acceptance of a pre-registration agreement (i.e. pre-usage indicator). The client device may then present the network and the pre-registration agreement requirement to a user of a client device. Upon the user selecting the network, the client device may transmit a request for the pre-registration agreement to the access device and the access device may transmit the pre-registration agreement to the client device. The client device presents the agreement text to the user.

Upon receiving an indication that the user accepts the agreement, the client device calculates a representation of the received text. The client text sends a registration request including the calculated representation and a time value that represents the date of acceptance. The access device uses the representation and time value to determine a validity of the registration request. As another example, the access point may compare the time value to an agreement creation date to determine that the acceptance date occurred after the creation date. Based on a determination that the registration request is valid, the access device may send a registration response to the computing device to allow it to register with the access device. Accordingly, examples disclosed herein allows for the agreement transmission and validation of agreement acceptance to be between the access device and the client device without the need of a firewall or re-direction of traffic.

In some examples, a computing device is provided with a non-transitory machine-readable storage medium. The non-transitory machine-readable storage medium includes instructions, that when executed, cause a processing resource to transmit a frame to a computing device, wherein the frame comprises an identifier of a pre-usage agreement for a network. The storage medium also includes instructions, that when executed, cause the processing resource to receive a request for the pre-usage agreement and transmit the pre-usage agreement to the computing device in response to receiving the request. Additionally, the storage medium includes instructions, that when executed, cause the processing resource to receive, from the computing device, a registration request, validate the registration request, and, transmit a registration response to the computing device. The registration request comprises a calculated representation of the pre-usage agreement indicating an acceptance of the pre-usage agreement by a user associated with the computing device.

In some examples, a computing device comprises a first communication engine, an agreement engine, a second communication engine, an acceptance engine, and a calculation engine. The first communication engine is to receive a frame from an access device. The frame comprises a unique identifier of a pre-usage agreement. The receiving of the packet is before the computing device registers with the access device. The agreement engine is to present the network and the agreement requirement to a user and to receive a selection of the network from the user. The second communication engine is to, in response to receiving the selection of the network, transmit a request for the pre-usage agreement to the access device and receive the pre-usage agreement from the access device. The acceptance engine is to present the pre-usage agreement to the user and receive an acceptance indicator from the user. The calculation engine is to, in response to receiving the acceptance indicator, determine a calculated representation of the pre-usage agreement. The first communication engine also is to transmit a registration request comprising the calculated representation to the access device.

In some examples, a method comprises transmitting a frame to a computing device. The frame comprises an identifier of a pre-usage agreement in a tag-length-value (TLV). The method also includes, receiving a request from the computing device for the pre-usage agreement, transmitting the pre-usage agreement to the computing device, receiving the registration request comprising a calculated representation of the pre-usage agreement, validating the registration request, and transmitting a registration response to the computing device. The transmission of the pre-usage agreement is in response to receiving the request for the agreement. The method may be performed by a processing resource of an access device.

Referring now to the figures, FIG. 1 is a block diagram of an access device 100 to transmit a pre-usage agreement to a computing device. The transmission is prior to registration of the computing device with access device 100. As used herein, a "computing device" may be a server, a networking device, chip set, desktop computer, workstation, a mobile phone, a tablet, an electronic reader, or any other processing device or equipment. As used herein, an "access device" may be a computing device that allows another computing device to connect to and/or form a wireless network (e.g., a wireless local area network (WLAN), wireless personal area network (WPAN), etc.). The protocols used by the access device may differ depending on the type of wireless connection. For example, in a WLAN connection, the access device may be referred to as a wireless access point (WAP) and use a format set by IEEE standards (e.g. 802.11n, 802.11ac, 802.11ad, 802.11ax, etc.).

As used herein, a registration of a computing device with an access device includes the access device recognizing and recording the presence of the computing device. Accordingly, upon registration, the computing device is assigned an identity in the network. Additionally, upon registration, the computing device and the access device understands how to send transmissions to each other (e.g., encryption types to use, parameters of data transmission, etc.) Thus, the registration of the computing device with the access device allows the network to know where to send data that is intended for that computing device (e.g., through the associated access device). Registration of a computing device to an access device is different from authentication of the computing device. In some examples, authentication of the computing device occurs before registration of the computing device. In other examples, authentication occurs after registration of the computing device. In some technologies, such as in IEEE protocols, this registration is known as association. Registration is also different from introductory or preliminary transmissions between the access device and the computing device that serve to let each other know about the presence of the other.

Access device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, 115, 116, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1, instructions 111, 112, 113, 114, 115, and 116 are stored (encoded) on machine-readable storage medium 110 and are executable by processing resource 101 to implement functionalities described herein in relation to FIG. 1. In some examples, machine-readable storage medium 110 may include additional instructions, like, for example, the instructions to implement some of the functionalities described in relation to access device 200 in FIG. 2 or access device in FIG. 4. In other examples, the functionalities of any of the instructions of machine-readable storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, 115, and 116 as described herein.

Instructions 111 may be executable by processing resource 101 to transmit a frame to a computing device. The transmission may occur over a wireless connection between access device 100 and the computing device. For example, the access device may be connected (either wired or wirelessly) to a network. The network may be wireless network, a wired network, or a combination thereof. In some examples, the network may be an individual network or a collection of many such individual networks interconnected with each other and functioning as a single large network (e.g., the Internet or an intranet). In some examples, the network may be a local area network (LAN), wide area network (WAN), etc. Thus, access device 100 may allow computing device to connect to and use the network.

The frame transmitted by access device 100 comprises an identifier of a pre-usage agreement for the network. As used herein, a pre-usage agreement includes text that details at least one condition of using the service and/or product associated with the pre-usage agreement. A computing device desiring to use a network with a pre-usage agreement has to indicate to the network that the computing device has accepted the pre-usage agreement before the network will allow the computing device to use the network. The conditions may set boundaries on the usage of the network and may be set by the provider of the network. For example, a pre-usage agreement of a network provided by a governmental body may limit the use of the network to official government purposes. As another example, a pre-usage agreement may state that users must refrain from using the network in an illegal manner. Non-limiting examples of pre-usage agreements include terms and conditions (TNC) documents, licenses, etc.

An identifier of a pre-usage agreement may include characters (e.g., numeric, alphabetic, alphanumeric, symbols, etc.) that are used to refer to the pre-usage agreement. In some examples, the identifier is unique to the pre-usage agreement. In other words, a specific identifier refers to a specific pre-usage agreement and is not used to refer to another pre-usage agreement. In these examples, the identifier may be generated from a one-way security function that uses the pre-usage agreement as an input. Accordingly, the one-way security function may map the pre-usage agreement (which may vary in size) to a dataset of fixed size. Some non-limiting examples of one-way security functions that may be used to generate the identifier include those of the Secure Hash Algorithm (SHA) family (e.g., SHA-1, SHA-256, SHA-512, SHA-3, etc.), MD5, etc. While various functions may be used, in some examples, the one-way security function may be a function with high collision resistance to ensure a unique value for a specific pre-usage agreement. In some examples, the identifier and the pre-usage agreement may be generated by the provider of the network and stored on access device 100. In other examples, the identifier may be generated by the access device 100 using the pre-usage agreement provided by the network provider. Thus, in these examples, machine-readable storage medium 110 may include instructions to generate the identifier of the pre-usage agreement.

Accordingly, instructions 111 is executable by processing resource 101 to transmit the identifier in a frame to the computing device. In some examples, the identifier may be stored in a tag-length-value (TLV) (e.g., Information Element (IE), etc.) designated for the identifier inside the frame. In some examples, the frame may be sent as part of a procedure that introduces/re-introduces the network to computing devices. For example, an access device may transmit the frame in a signal to advertise the presence of the network to computing devices. In some examples (e.g., in IEEE 802.11 standards), this can be a Beacon frame. As another example, an access device may transmit the frame in a signal that is a response to a first signal received from a computing device. This can be a Probe Response in some examples (e.g., in IEEE 802.11). In some examples, the frame may be transmitted each time the computing device tries to register with the access device. This includes instances when the computing device encounters the network for the first time and instances when the computing device has previously encountered the network (e.g., the computing device leaves the range of the access device and comes back within range at a later time).

In some examples, and not shown in FIG. 1, the frame transmitted using instructions 111 may also include an indicator of the pre-usage agreement (i.e. pre-usage indicator). The indicator may be stored in a TLV designated for the indicator and may serve to notify to the computing device that the network has a pre-usage requirement. The frame transmitted may include, in addition to the identifier and/or indicator, other information as set by the protocol being used, including service set identifiers (SSIDs), beacon intervals, supported data transfer rates, etc.

Instructions 112 may be executable by processing resource 101 to receive a request (i.e. query) for the pre-usage agreement from the computing device. For example, a user of the computing device may decide that they want to use the network associated with access device 100 and may communicate this to the computing device (e.g., via a selection in a graphical user interface). The computing device may, in turn, transmit a request to access device 100 for the pre-usage agreement. Instructions 112 are executable by processing resource 101 to allow access device 100 to receive the request. The request is received before the computing device registers with access device 100. Accordingly, in some examples, the request may be in a frame in a TLV that allows additional information to be gleaned about the network beyond what is conveyed in the initial introductory frames exchanged between the computing device and the access device (e.g., the Beacon frame, etc.). A non-limiting example of such a TLV is an Access Network Query Protocol (ANQP) element. The ANQP element may be designated for a pre-usage agreement. In some examples, the ANQP element may be requested via a Generic Advertisement Service (GAS) query. GAS allows the computing device to request more information (e.g., via an ANQP element) from access device 100 about the network before the computing device decides to register with the access device.

Instructions 113 may be executable by processing resource 101 to transmit the pre-usage agreement to the computing device in response to receiving the request for the pre-usage agreement. In some examples, the response may be in a TLV that allows additional information to be gleaned about the network, such as an ANQP element. Thus, in some examples, the transmission is a GAS frame(s) comprising the pre-usage agreement. This frame may be considered an ANQP response.

Instructions 114 may be executable by processing resource 101 to receive a registration request. The registration request comprises a calculated representation of the pre-usage agreement. The registration request with the calculated representation may come from the computing device after the user of the computing device has indicated (e.g., via a user input, etc.) that they have satisfied the requirement set by the network provider. For example, the network provider may require that the user indicate that they have read the pre-usage agreement. As another example, the network provider may require that the user indicate that they agree to limit their usage of the network as defined in the pre-usage agreement. Upon the indication of the user to the computing device that the user has satisfied the requirements, the computing device may send the registration request comprising the calculated representation to access device 100. Accordingly, the calculated representation may indicate to access device 100 that a user of the computing device has accepted the pre-usage agreement.

In some examples, the registration request is called an association request and transmitted in an association request frame (e.g., in IEEE 802.11). As used herein, a calculated representation of the pre-usage agreement may include characters (e.g., numeric, alphabetic, alphanumeric, symbols, etc.) that are used to refer to the pre-usage agreement. In some examples, the calculated representation is unique to the pre-usage agreement. In other words, a specific representation refers to a specific pre-usage agreement and does not refer to another pre-usage agreement. In these examples, the calculated representation may be generated from a one-way security function that uses the pre-usage agreement as an input. Accordingly, the one-way security function may map the pre-usage agreement (which may vary in size) to a dataset of fixed size. Some non-limiting examples of one-way security functions that may be used to generate the calculated representation include those of the Secure Hash Algorithm (SHA) family (e.g., SHA-1, SHA-256, SHA-512, SHA-3, etc.), Message Digest family (e.g., MD5), etc. While various functions may be used, in some examples, the one-way security function may be a function with high collision resistance to ensure a unique value for a specific pre-usage agreement.

The calculated representation is generated by the computing device upon its analysis of the text of the received pre-usage agreement. Thus, in examples where a one-way security function is used to generate the calculated representation, the pre-usage agreement may be used as an input to the security function. In some examples, the calculated representation may be compared against the identifier to verify that the pre-usage agreement received by the computing device is the actual pre-usage agreement that the network provider intended for the user to receive. Accordingly, in some examples, the identifier and the calculated representation of the same pre-usage agreement should be identical to each other (e.g., the same one-way security function is used to generate both the identifier and the calculated representation). In other examples, the identifier and the calculated representation of the same pre-usage agreement may be derivations of the other (e.g., the calculated representation, when inputted into another function, may be used to obtain the identifier, or vice versa).

The calculated representation may be stored in a TLV (e.g., Information Element, etc.). In some examples, the TLV may be the same TLV that is used for the identifier.

In some examples, and not shown in FIG. 1, the registration request may also include a time value. The time value may record a date of when the user indicated that they read and/or accepted the pre-usage agreement. The time value may be stored in a TLV (Information Element, etc.) that is designated for the time value. In some examples, and as described below in relation to instructions 115, the time value may be used as one way to verify a validity of a registration request sent by the computing device.

Instructions 115 may be executable by processing resource 101 to validate the registration request. A validity of the registration request may be based on, at least in part, the calculated representation. Specifically, the calculated representation may be compared to the identifier. As discussed above, the calculated representation may be used to verify that the pre-usage agreement received by the computing device is the agreement that is intended to be sent by the network.

Thus, in some examples, the identifier and the calculated representation should be identical to each other. In these examples, based on a determination that the identifier and the calculated representation are identical to each other, then processing resource 101 determines that the registration request is valid. Based on a determination that the identifier and the calculated representation are not identical to each other, processing resource 101 determines that the registration request is invalid.

In other examples, the identifier and the calculated representation should be derivations one another, based on at least one derivation function, mathematical rule, etc. In these examples, based on a determination that the identifier and the calculated representation are correct derivations of one another based on the at least one derivation function, mathematical rule, etc., processing resource 101 determines that the registration request is valid. Based on a determination that the identifier and the calculated representation are not derivations of one another based on the at least one derivation function, mathematical rule, etc. processing resource 101 determines that the registration request is invalid.

As discussed above in relation to instructions 114, in some examples, the registration request may include a time value. In these examples, the registration request may also be validated based, at least in part, on the time value. For example, the pre-usage agreement may be created by the provider on a certain date. This date may be characterized as a creation date and provided to the access point along with the pre-usage agreement. In some examples, the creation date of the pre-usage agreement is not revealed (e.g., transmitted) to the computing device. Rather, access point 100 may store the pre-usage agreement for the network and associate it with the creation date. In these examples, access point 100 may use the creation date as another way to determine a validity of the registration request. For example, instructions 115 may include instructions to compare the creation date to the time value. Based on a determination that the time value is later in time than the creation date, access device 100 determines that that the registration request is valid. Based on a determination that the time value is at the same time and/or later in time than the creation date, access device 100 determines that the registration request is invalid. This is because the time value indicates that the pre-usage agreement was read and/or accepted by the user before the pre-usage agreement was created. This may be sent by a computing device that is a bad actor.

Instructions 116 may be executable by processing resource 101 to transmit a registration response to the computing device. Accordingly, based on a determination that the registration request is valid, access device 100 transmits a registration response comprising an acceptance notice. The acceptance notice may include information set by the technology protocol (e.g., an association identifier in IEEE 802.11 standards, etc.) and notify the computing device that it is registered to the access point 100. Accordingly, instructions 116 may also include instructions to create an ID that identifies the computing device based on a determination that the registration request is valid. After registration, the computing device may have full access to the network associated with access device and may send data packets. In a WLAN network compliant with the IEEE standards (e.g., 802.11, etc.), this device is known as being associated to the access device.

Based on a determination that the registration request is invalid, access device 100 transmits a registration response comprising a rejection notice. This lets the computing device know that it is not been allowed to register with access device 100. In a wireless protocol that performs authentication after registration (e.g., IEEE 802.11u), the computing device does not proceed to authentication. In a wireless protocol that performs authentication before registration, the computing device may be referred to an authenticated but unregistered computing device.

Accordingly, the ability of access device 100 to transmit the pre-usage agreement and validate the acceptance of the pre-usage agreement (e.g., by verifying that the accepted agreement is the intended agreement) prior to registration of the computing device allows for a quicker and simplified agreement process in networks requiring pre-usage agreements. Examples described herein improves upon the agreement process by removing the usage of complicated firewalls, separate servers to host agreements, and extra network communications for agreement transmission. Examples herein also remove the confusion that may result for users when they incorrectly believe that their devices have full access to the network when, in actuality, they do not. This is because, in examples disclosed herein, their computing devices will not be registered until they have already satisfied the agreement requirements whereas in other solutions, the computing devices are registered but firewalled.

Machine-readable storage medium 110 may also include instructions, not shown in FIG. 1, to implement other aspects of wireless technology protocols. For example, storage medium 110 may include instructions to receive an authentication request (e.g. an authentication frame) and instructions to transmit an authentication response (e.g., authentication frame set to open) so that access device 100 may authenticate the computing device.

Figure 2:
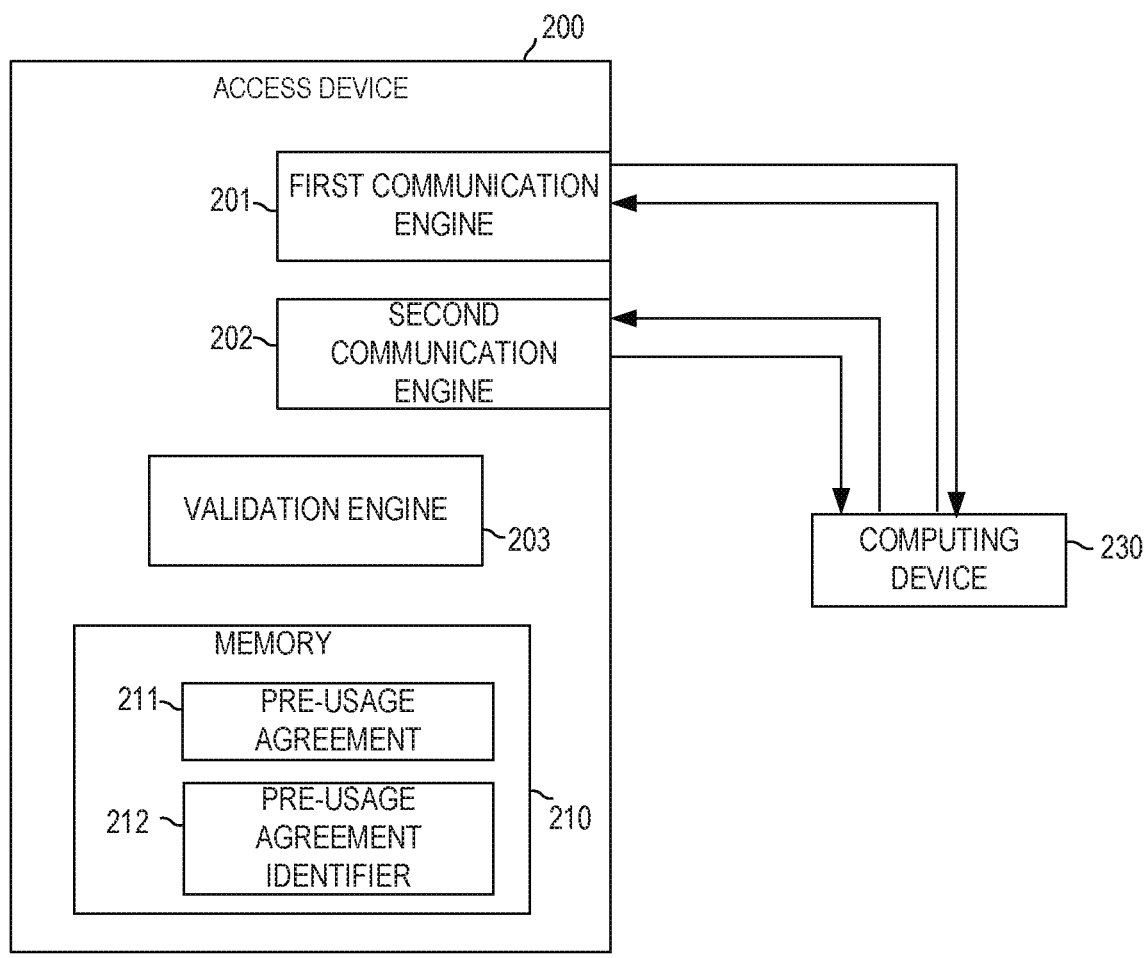
FIG. 2 is a block diagram of an access device with communication engines to transmit a pre-registration agreement prior to registration of a computing device to the access device, according to some examples.
Figure 4:
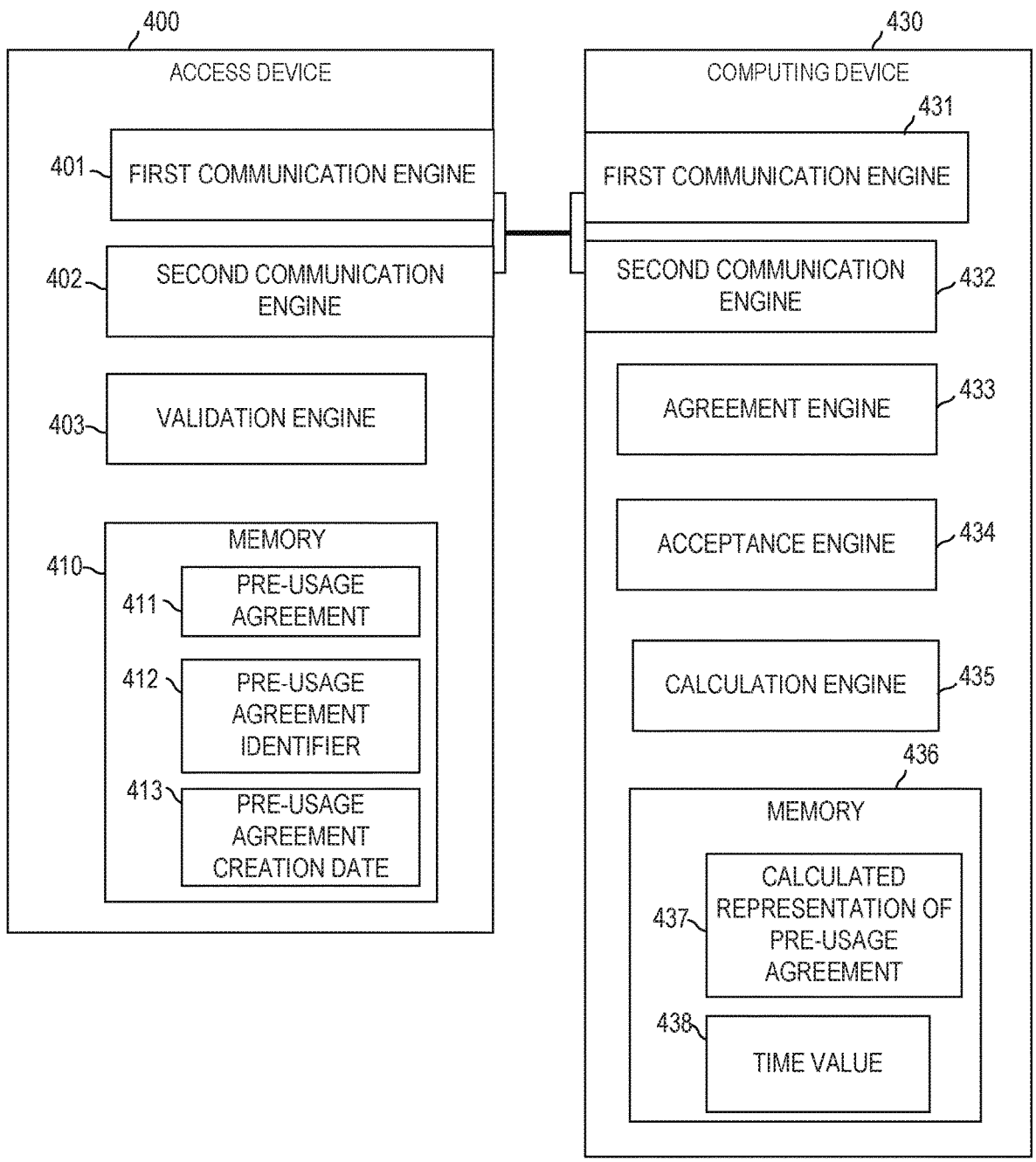
FIG. 4 is a block diagram of an access device and a computing device interfacing with one another to transmit and receive a pre-registration agreement, according to some examples.

Access device 100 of FIG. 1, which is described in terms of processors and machine-readable storage mediums, can include one or more structural or functional aspects of access device 200 of FIG. 2, or access device 400 of FIG. 4, which are described in terms of engines containing hardware and software.

FIG. 2 is a block diagram of an access device 200 to validate a read and/or acceptance indication of a pre-usage agreement. Access device 200 comprises first communication engine 201, second communication engine 202, and validation engine 203. Other engines may be added to access device 200 for additional or alternative functionality. Engines 201, 202, and 203 may interface with memory 210. Memory 210 may be a machine-readable storage medium of computing device that is protected by hardware. In some examples, memory 210 may be implemented by Read-Only Memory (ROM) and immutable. In some examples, memory 210 may be implemented by flash (e.g., electrically erasable programmable read-only memory, EEPROM), or a combination thereof. Memory 210 stores at least a pre-usage agreement 211 and an identifier 212 for the pre-usage agreement 211. In some examples, pre-usage agreement 211 and identifier 212 may be transmitted to access device 200 over the network associated with access device 200. For example, pre-usage agreement 211 may be configured by an administrator of the network at a different computing device, and sent to access device 200 to be transmitted to computing devices like computing device 230 upon need.

Each of engines 201, 202, and 203, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, access device 200 may include additional engines.

Each engine of access device 200 can include at least one machine-readable storage mediums (for example, more than one) and at least one computer processor (for example, more than one). For example, software that provides the functionality of engines on access device 200 can be stored on a memory of a computer to be executed by a processor of the computer. In some examples, software that provides the functionalities of engines 201, 202, and 203, are also stored in memory 210.

First communication engine 201 is an engine of access device 200 that includes a combination of hardware and software. First communication engine 201 allows access device to transmit a frame to computing device 230. In some examples, the frame may be an "introduction" or a "re-introduction" of the network that is associated with access device 200 to computing device 230. For example, in IEEE (e.g., 802.11, etc.) wireless protocol, the frame may be a Beacon frame or a Probe Response frame. The frame comprises an identifier of a pre-usage agreement for the network. In some examples, the identifier may be stored in a TLV (e.g., Information Element (IE), etc.) designated for the identifier. First communication engine 202 also allows access device 100 to receive a registration request and transmit a registration response, as discussed below.

Second communication engine 202 is an engine of access device 200 that includes a combination of hardware and software. Second communication engine 202 allows access device 200 to receive a request for the pre-usage agreement and to transmit the pre-usage agreement in response to receiving the request. In some examples, the communication protocols that second communication engine 202 may use to do this include mechanisms that allow the computing device to discover more information about the network before deciding to register with the access device. The additional information discoverable via these mechanisms are not included in the "introductory" frame (e.g., such as in the Beacon frame, etc.). For example, in WLAN using IEEE, second communication engine 202 may use the Access Network Query Protocol (ANQP) within Generic Advertisement Service (GAS) frames. Specifically, the request received by second communication engine 202 may include an ANQP element designated for the pre-usage agreement in a GAS frame (i.e., a GAS Request) and the response transmitted by the second communication engine 202 may be the pre-usage agreement (i.e., a GAS Response including the requested ANQP element). While ANQP and GAS are described herein in relation to IEEE, other protocols providing similar mechanisms may be used in other wireless technologies.

Upon receiving the pre-usage agreement, computing device 230 may present the pre-usage agreement to the user along with a selection (e.g., a user interface) that the user may use to indicate that they have read and/or accepted the pre-usage agreement. The computing device 230 may send the registration request to access device 200. This registration request may be received by first communication engine 201. Thus, first communication engine 201 also allows access device 200 to receive the registration request. The registration request comprises a calculated representation of the pre-usage agreement which indicates to access device 200 that a user of computing device 230 has read and/or accepted the pre-usage agreement. In some examples, this calculated representation may be stored in the same TLV that was used to store the identifier. In examples where IEEE (e.g., 802.11, etc.) is used, the registration request may be referred to as an Association Request frame.

Validation engine 203 is an engine of access device 200 that includes a combination of hardware and software and allows access device 200 to validate the registration request. In some examples, validation engine 203 may compare the identifier of the pre-usage agreement to the calculated representation of the pre-usage agreement to validate the registration request, as discussed above in relation to instructions 115 of FIG. 1.

In some examples, the identifier and the calculated representation should be identical to each other. In these examples, based on a determination that the identifier and the calculated representation are not identical to each other, validation engine 203 may determine that the registration request is invalid. Based on a determination that the identifier and the calculated representation are identical to each other, validation engine 203 may determine that the registration request is valid.

In other examples, the identifier and the calculated representation should be derivations of one another, based on at least one derivation function, mathematical rule, etc. In these examples, based on a determination that the identifier and the calculated representation are not derivations of one another based on the at least one derivation function, mathematical rule, etc., validation engine 203 may determine that the registration request is invalid. Based on a determination that the identifier and the calculated representation are correct derivations of one another, validation engine 203 may determine that the registration request is valid. In these examples, memory 210 may also store the mathematical rule, derivation function, etc. used.

In some examples, in addition to having an acceptable calculated representation (i.e., one that is identical to the identifier or is a derivation of the identifier), the registration request should also meet other criteria(s) set by the wireless technology protocol being used in other to be valid. For example, a registration request may have an acceptable calculated representation, but may still be invalid because the data rates expressed in the registration request are not compatible with the data rates of access device 200.

First communication engine 201 may also allow access device 200 to transmit a registration response. Based upon a determination that the registration request is valid, first communication engine 201 may transmit a registration response comprising an acceptance notice. The acceptance notice signals to computing device 230 that it is registered with access device 200. The notice may include any identifiers that access device 200 has generated and assigned to computing device 230. In some examples, this identifier may be known as an Association ID that identifies computing device 230 to the access device 200 and to the network. Accordingly, first communication engine 201 may allow access device 200 to generate an identifier for computing device 230 based on the determination of a validity of the registration request. Based upon a determination that the registration request is invalid, first communication engine 201 may transmit a registration response comprising a rejection notice. Accordingly, the computing device 230 is not allowed to register with access device 200.

While access device 200 is described in relation to one pre-usage agreement 211 and one pre-usage agreement identifier 212, access device 200 is not limited to storing the number of agreements and/or identifiers described. For example, access device 200 may store two pre-usage agreements for two different networks. Access device 200 may accordingly store two pre-usage agreement identifiers, with each pre-usage agreement having one identifier.

Access device 200 of FIG. 2, which is described in terms of engines containing hardware and software, can include one or more structural or functional aspects of access device 400 of FIG. 4, or access device 100 of FIG. 1, which is described in terms of processors and machine-readable storage mediums. Access device 200 may also include additional engines to implement other aspects of wireless technology protocols. For example, access device 200 may include engines to receive an authentication request (e.g. an authentication frame) and instructions to transmit an authentication response (e.g., authentication frame set to open) so that access device 200 may authenticate computing device 230.

Figure 3:
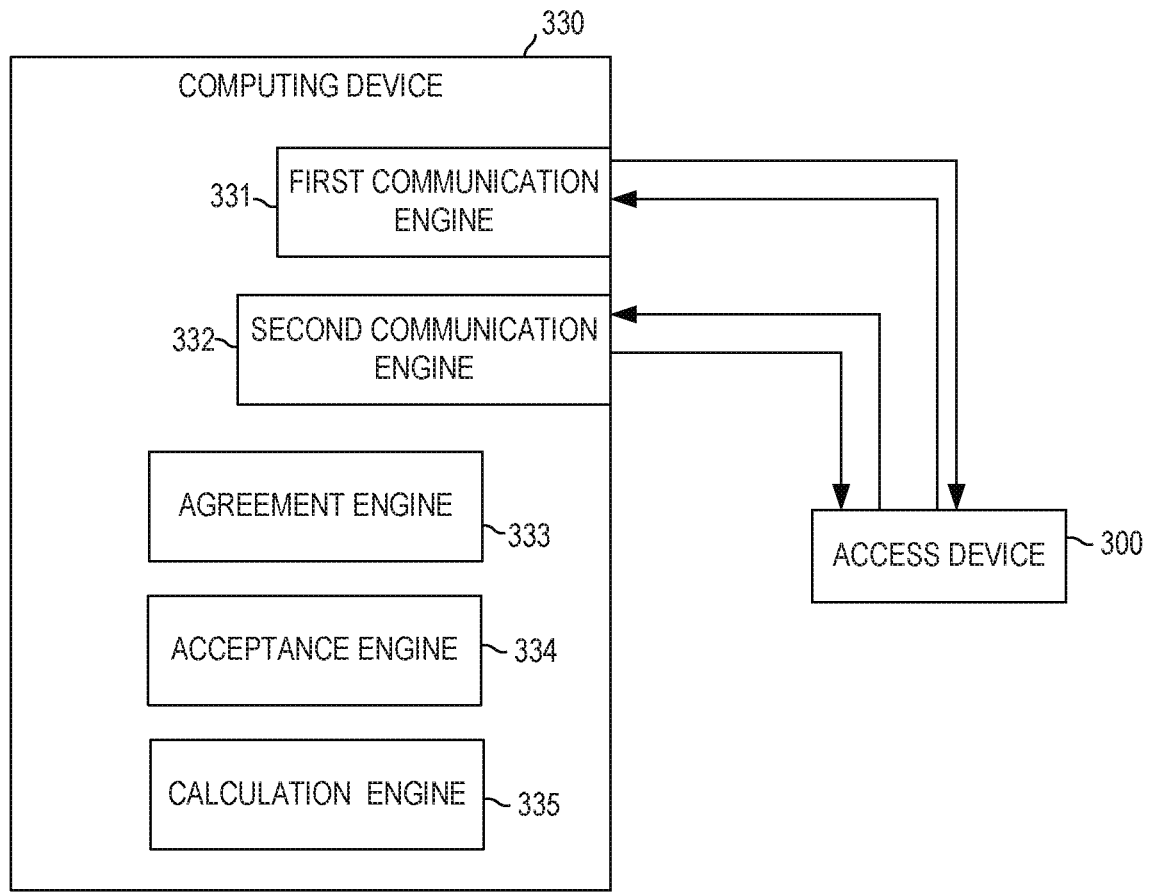
FIG. 3 is a block diagram of a computing device to receive a pre-registration agreement from an access device prior to registration to the access device, according to some examples.

FIG. 3 is a block diagram of a computing device 330 to receive and accept a pre-usage agreement from access device 300 before registering with access device 300. In some examples, computing device 330 may be a mobile phone, a tablet, a laptop, a desktop, etc. Computing device 330 comprises first communication engine 331, second communication engine 332, agreement engine 333, acceptance engine 334, and calculation engine 335.

Each engine of computing device 330 can include at least one machine-readable storage mediums (for example, more than one) and at least one computer processor (for example, more than one). For example, software that provides the functionality of engines on computing device 330 can be stored on a memory of a computer to be executed by a processor of the computer.

First communication engine 331 includes a combination of hardware and software that allows computing device 330 to receive a frame from access device 300. Access device 300 and computing device 330 may communicate via a wireless technology (e.g., Wi-Fi® as standardized by IEEE, etc.). The frame comprises a pre-usage indicator and a unique identifier of a pre-usage agreement for a network associated with access device 300. Identifier, as described above in relation to instructions 111 for FIG. 1, is applicable here. The pre-usage indicator may be a value that lets computing device 330 know that the particular network has a pre-usage agreement. The frame is received by first communication engine 331 before computing device 330 registers with access device 300. In some examples, the frame may be a Beacon frame sent by access device 300 to advertise a network. In some examples, the frame may be a Probe Response sent by access device 300 in response to a signal sent by computing device 330. In some examples, the frame is received by first communication engine 331 before computing device 330 is authenticated to access device 300.

Agreement engine 333 includes a combination of hardware and software that allows computing device 330 to present the network and an agreement requirement to a user of computing device 330. For example, agreement engine 333 may implement a graphical user interface (GUI) that shows the network name and the fact that the network requires that the user reads and/or accepts a pre-usage agreement. Thus, an agreement requirement is a notice to the user that the network has a pre-usage agreement. Agreement engine 333 also allows computing device 330 to receive a selection of the network from the user. For example, the user may decide to try to connect to the network. The user may interact with the GUI presented by agreement engine 333 to indicate that they want to connect to the network. Agreement engine 333 allows computing device 330 to receive and understand the selection of the user.

Second communication engine 332 includes a combination of hardware and software that allows computing device 330 to, in response to receiving the selection of the network, transmit a request for the pre-usage agreement to access device 300. In some examples, second communication engine 332 may implement protocols that allow a computing device to discover additional information about the network and/or the access device before deciding to register. In some examples, second communication engine 332 may use a GAS frame requesting a specific ANQP element that is designated for the pre-usage agreement. Second communication engine 332 also allows computing device 330 to receive the pre-usage agreement from access device 300. The pre-usage agreement may be sent using GAS frame(s).

Acceptance engine 334 includes a combination of hardware and software that allows computing device 330 to present the pre-usage agreement to the user. For example, acceptance engine 332 may implement a graphical user interface (GUI) that shows the pre-usage agreement text to the user along with a read and/or accept button that the user may push. Acceptance engine 334 also allows computing device 330 to receive an acceptance indicator from the user. The acceptance indicator includes the signal that is translated from the user pushing the read and/or accept button.

Calculation engine 335 includes a combination of hardware and software that allows computing device 330 to determine a calculated representation of the pre-usage agreement. This is in response to receiving the acceptance indicator. Thus, once the user decides to indicate that they have read and/or accept the pre-usage agreement, they may interact with the GUI to signal to computing device of their decision. This signal may be characterized as an acceptance indicator. Acceptance engine 334 receives this acceptance indicator and may forward it to calculation engine 335. Calculation engine 335 may then determine the calculated representation. As discussed above, in some examples, the calculated representation may be determined via a one-way security function using the pre-usage agreement as an input. Accordingly, calculation engine 335 may implement this security function.

Once the calculated representation of the pre-usage agreement is determined, first communication engine 331 may allow computing device 330 to send a registration request to access device 300. The registration request includes the calculated representation. In some examples, the calculated representation may be stored in the same TLV that is used for the identifier, as described above. In some examples, the registration request also includes additional information that may be set by the wireless protocol being used. For example, in a network environment compliant with IEEE WLAN protocols (e.g., IEEE 802.11 standards, etc.), the registration request may be in an Association Request frame. The Association frame may comprise Information Elements, with one Information Element for the calculated representation. Another Information Element in the Association Request frame may include a MAC address, the network name, etc.

First communication engine 331 may also allow computing device 330 to receive a registration response from access device 300.

Computing device 330 of FIG. 3 can include one or more structural or functional aspects of computing device 430 of FIG. 4. Additionally, computing device 330 may also include additional engines, not shown in FIG. 3, to implement other aspects of wireless technology protocol. For example, computing device 330 may have an engine to transmit an authentication request so that it may be authenticated by access device 300. While computing device 330 is described in terms of engines comprising hardware and software, in other examples, these engines may be implemented by processors and machine-readable storage mediums.

FIG. 4 is a block diagram of a computing device 430 interfacing with an access device 400. Computing device 430 and access device 400 communicate to each other using a wireless technology (e.g., IEEE 802.11, etc.) Access device 400 is also connected to a network (not shown in FIG. 4.) For computing device 430 to use the network, computing device 430 must register with access device 400.

Access device 400 is similar to access device 300, except that access device 400 stores an agreement creation date 413 for pre-usage agreement 411 in memory 410. The descriptions of first communication engine 301, second communication engine 302, pre-usage agreement 311, and agreement identifier 312, are applicable to first communication engine 401, second communication engine 402, pre-usage agreement 411, and agreement identifier 412, respectively. Validation engine 403 is similar to validation 303, except that validation engine 403 may use agreement creation date 413 as a way to validate the registration request sent by computing device 430.

The agreement creation date 413 may be stored on memory 410 in manner such that it is associated to pre-usage agreement 411. Thus, access device 400 is aware that pre-usage agreement 411 was created on the agreement creation date. Access device 400 does not share the creation date with computing device 430. Instead, validation engine 403 may rely upon it when determining a validity of the registration request.

As discussed above in relation to instructions 114, the registration request sent may include a time value that corresponds to the date of when user of computing device 430 read and/or accepted the pre-usage agreement. Validation engine 403 may allow access device 400 to validate the association response by comparing the creation date to the time value. Based on a determination that the date captured by the time value is later in time than the creation date, validation engine 403 may determine that that the registration request is valid. Based on a determination that the date captured by the time value is at the same time and/or later in time than the creation date, validation engine 403 may determine that the registration request is invalid. This is because a later-in-time time value indicates that the pre-usage agreement was read and/or accepted by the user before the pre-usage agreement was created. This indicates that the computing device sending the registration request may be a bad actor.

Computing device 430 is similar to computing device 330, except that computing device 430 comprises a memory 436 to store a calculated representation of the pre-usage agreement 437 and a time value 438. Accordingly, agreement engine 433, acceptance engine 434, and calculation engine 435 may be similar to agreement engine 333, acceptance engine 334, and calculate engine 335, respectively, except for at least the functionalities described below.

In some examples, memory 436 may comprise a secondary memory to store calculated representation 437 and time value 438. Calculated representation 437 and time value 438 may be stored such that computing device 430 knows which network they are for (e.g., in a table that associates the time value and/or calculated representation with the network, etc.) In these examples, computing device 430 may use the calculated representation 437 and/or the time value 438 to determine whether computing device 430 has already received and accepted a pre-usage agreement 411 for the network. This is because, in some examples, computing device 430, may move in and out of the range of access device 400 due to the change in location of computing device 430 and/or access device 400.

For example, computing device 430 may be a mobile phone. Throughout the course of a day, the user of the mobile phone may move it in and out of the range of access device 400. The first time computing device 430 tries to connect with the network presented by access device 400, agreement engine 433 may query memory 436 for calculated representation 437 and time value 438 for the network (e.g., agreement engine 433 queries memory 436 using the SSID of the network, etc.). Based on a determination that a calculated representation of the pre-usage agreement exists in memory 436, agreement engine 433 may determine that computing device 430 has previously connected to the network/associated with access device 400. Accordingly, agreement engine 433 compares the calculated representation already stored in memory 436 to the identifier 412 that it received from access device 400 (that is sent by first communication engine 401. e.g. in a Beacon frame, Probe Response frame, etc.). The calculated representation already stored in memory 436 may be characterized as a prior calculated representation.

If the prior calculated representation fits the criteria as described above to validate a registration request (e.g., the calculated representation is identical to the identifier, the calculated representation is a derivation of the identifier or vice versa, etc.), this means that the pre-usage agreement has not changed since the prior calculated representation 437 was generated and the pre-usage agreement that the user previously read and/or accepted is the same one currently being used by the network. Based on this determination, agreement engine 433 indicates that there is no need to present to the user that they will need to accept a pre-usage agreement before connecting to the network. Accordingly, agreement engine 433 may present the SSID to the user without presenting the agreement to the user. Accordingly, based on this determination, second communication engine 432 does not send a request for a pre-usage agreement. Similarly, acceptance engine 434 does not present the pre-usage agreement to the user and calculation engine 435 does not determine a new calculated representation of the pre-usage agreement. Rather, first communication engine 431 may send the prior calculated representation in the registration request that it sends to access device 400.

If there is no calculated representation 437 stored in memory 436 (no prior calculated representation) or if the prior calculated representation 437 does not fit the criteria as described above to validate a registration request, this means that the pre-usage agreement has changed since the calculated representation was generated. Accordingly, agreement engine 433 may invalidate the prior calculated representation 437 (e.g., by deleting the prior calculated representation, by indicating that the prior calculated representation is invalid, etc.) and present the network to the user along with an agreement requirement. Agreement engine 433, acceptance engine 434, first communication engine 431, second communication engine 432, and calculation engine 435 may then proceed to request the pre-usage agreement, generate a new calculated representation, as discussed above. In these situations, the prior calculated representation (if any) may deleted and the new calculated representation will be stored in its place. Additionally, the prior time value (if any) will be deleted and the new time value will be stored in its place.

A prior time value 438 may also be used, in addition to a prior calculated representation, to determine the user has previously read and/or accepted the pre-usage agreement. For example, agreement engine 433 may query a time value 438 associated with the network. Based upon a determination that there is a prior time value, agreement engine 433 may determine how long it has been since the user read and/or accepted the agreement. For example, if the prior time value indicates that the user accepted the agreement longer than 6 months ago, agreement engine 433 may determine that this is too long ago (e.g., as the user may have forgotten the content of the pre-usage agreement). Accordingly, agreement engine 433 may invalidate the prior calculated representation 437 and present the network to the user along with an agreement requirement. Agreement engine 433, acceptance engine 434, first communication engine 431, second communication engine 432, and calculation engine 435 may then proceed to request the pre-usage agreement, generate a new calculated representation, as discussed above. In these situations, the prior calculated representation (if any) may be deleted and the newly calculated representation may be stored in its place. Additionally, the prior time value (if any) may be deleted and the new time value may be stored in its place.

Access device 400 of FIG. 4, can include one or more structural or functional aspects of access device 100 of FIG. 1, or access device 200 of FIG. 2. Computing device 430 of FIG. 4 can include one or more structural or functional aspects of computing device 330 of FIG. 3. Additionally, computing device 430 and access device 400 may also include additional engines, not shown in FIG. 4, to implement other aspects of wireless technology protocol.

While FIG. 4 is described in relation to one pre-usage agreement, access device 400 and/or computing device 430 is not limited to the number of agreements described. For example, computing device 430 may store multiple calculated representations and/or time values, one of each for different pre-usage agreements.

Figure 5:
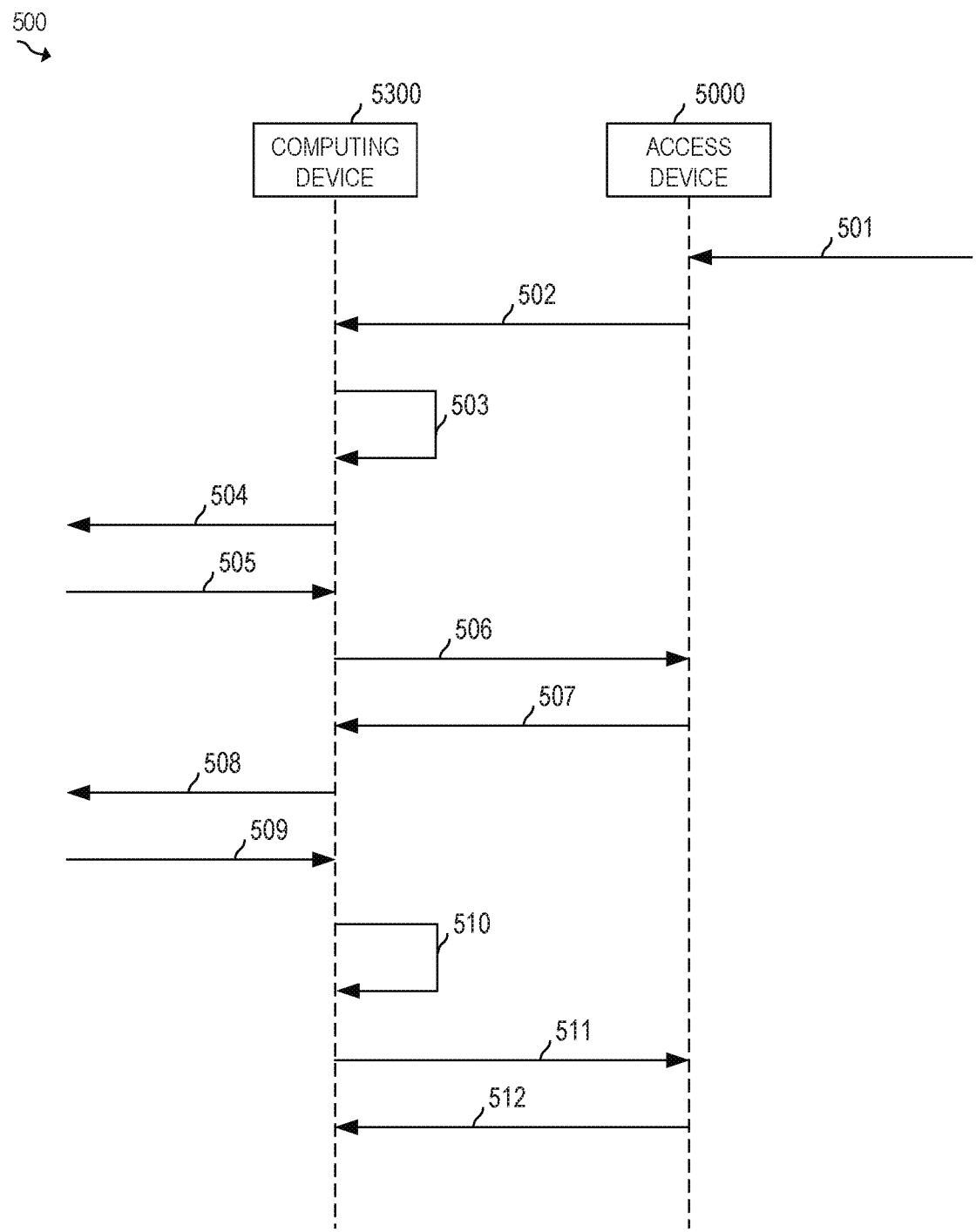
FIG. 5 is a diagram of the sequence of communications for transmitting and receiving a pre-registration agreement using local area network technology, according to some examples.

FIG. 5 is a diagram of communications between access device 5000 and computing device 5300 using local area network wireless technology such as IEEE 802.11. Access device 5000 may comprise the engines and/or instructions of access device 100 of FIG. 1, access device 200 of FIG. 2, and/or access device 300 of FIG. 3. Computing device 5300 may comprise the engines of computing device 330 of FIG. 3 and/or computing device 430 of FIG. 4.

Access device 5000 may receive a pre-usage agreement for a network and an identifier of the agreement represented by 501. This may come from a provider of the network and be communicated using TCP (Transmission Control Protocol), Internet Protocol (IP), etc. Access device 5000 may transmit a frame 502 to computing device 5300 comprising the identifier of the agreement and a pre-usage indicator. Frame may be a Beacon frame, a Probe Response frame, etc. Computing device 5300 may check the identifier at 503 to determine whether the user has previously read and/or accepted the pre-usage agreement.

Assuming that the user has not previously read and/or accepted the pre-usage agreement, computing device 5300 presents a GUI 504 to the user comprising the SSID of the network and an agreement requirement. The user selects the network and the selection 505 is sent back to computing device 5300. Computing device 5300 then sends a pre-usage agreement request 506 to access device 5000. As discussed above, in some examples, this may be accomplished in GAS Request frame requesting for an ANQP element designated for the pre-usage agreement. Access device 5000 sends the pre-usage agreement 507 to computing device 5300 in a GAS Response frame. The GAS Response frame includes the ANQP element designated for the pre-usage agreement. Computing device 5300 presents a GUI 508 to the user comprising the text of the pre-usage agreement and a button for the user to select to indicate that they have read and/or accept the agreement. The user indicates that they have read and/or accept the agreement and the acceptance indicator 509 is sent back to computing device 5300. Computing device 5300 generates a calculated representation of the pre-usage agreement at 510. Computing device 5300 may also store a time value to record the date of pre-usage acceptance.

Computing device 5300 transmits an Association Request frame 511 comprising the calculated representation and the time value. Access device 5000 transmits an Association Response frame 512 based on a validity of the Association Request. As described above, the Association Response frame 512 may comprise an acceptance based on a determination that the Association Request is valid. The Association Response frame 512 may also comprise a rejection based on a determination that the Association Request is invalid.

In some examples, and not shown in FIG. 5, additional communications may be sent by access device 5000 and computing device 5300 after Association Response frame 512. For example, access device 5000 may transmit an identity request to computing device 5300. This identity request may serve as an authentication step. A non-limiting example of an identity request used in IEEE 802.11 is Extensible Authentication Protocol over LAN (EAPoL). Computing device 5300 may transmit an identity response to access device 5000 that is used to authenticate computing device 5300. Access device 5000 may analyze the request and send back a response regarding the identity authentication.

Additionally, additional computing devices may be used to validate the association request. For example, access device 5000 may communicate with an Authentication, Authorization, and Accounting (AAA) server (e.g., a Remote Authentication Dial-In User Service (RADIUS) server, etc.). Access device 5000 may transmit the calculated representation and/or time value that it received in the association request to the AAA server. The AAA server may also validate the request in the same manner that the access device 5000 validates the request and send its determination to the access device 5000. In some examples, the AAA server determination "trumps" the validation of access device 5000. This is because, in some examples, updates to the pre-usage agreement may be delivered to the AAA server before the updates reach the access device 5000. In other examples, access device 5000 may validate the Association Request, transmit the Association Response to computing device 5300, and then transmit the Association Request to the AAA server for additional validation. If the AAA server's determination of validity is different from the access point's determination of validity, access point 5300 may send a signal to reverse its previously sent Association Response. In examples where there is an identity authentication, access point 5300 may send the identity authentication to the AAA server along with the calculated representation and the time value for the AAA server to validate the association request and authentication.

Figure 6:
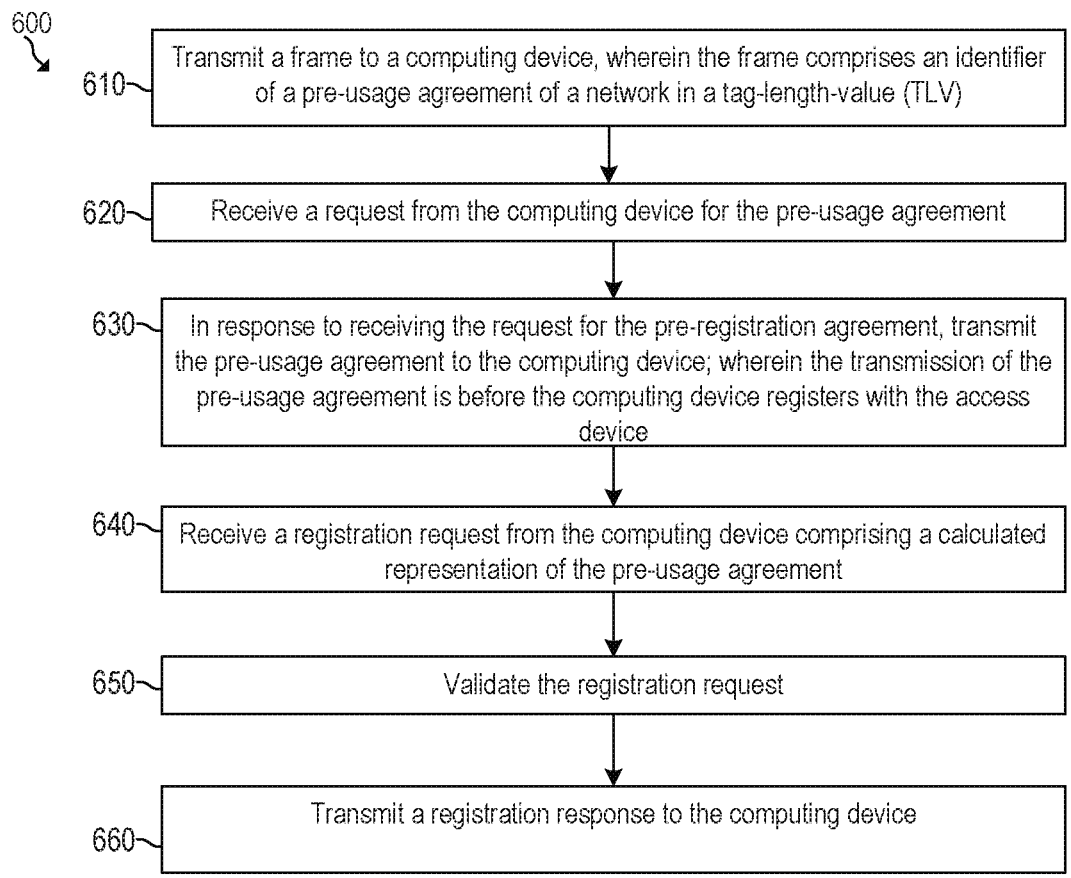
FIG. 6 is a flowchart of a method of transmitting a pre-registration agreement prior to registration, according to some examples.

FIG. 6 illustrates a flowchart for a method 600 to transmit a pre-usage agreement prior to registration of a computing device to an access device. Although execution of method 600 is described below with reference to access device 100 of FIG. 1, other suitable devices for execution of method 600 may be used (e.g., access device 200 of FIG. 2, access device 300 of FIG. 3, etc.).

At 610 of method 600, instructions 111 cause processing resource 101 of access device 100 to transmit a frame to a computing device. The computing device may be within the range of a signal propagated by access device 100 such that computing device may use that signal to connect to a network associated with access device 100. The frame comprises an identifier of a pre-usage agreement of a network. In some examples, the identifier may be stored in a tag-length-value (TLV) that is designated for the identifier. Some non-limiting examples of frame types include Beacon frames, Probe Response frames, etc.

At 620, instructions 112 cause processing resource 101 to receive a request from the computing device for the pre-usage agreement. In some examples, as described above, this request may be in an ANQP element over GAS (GAS Request).

At 630, instructions 113 cause processing resource 101 to transmit the pre-usage agreement to the computing device. In some examples, as described above, the response may be in an ANQP element over GAS (GAS Response).

At 640, instructions 114 cause processing resource 101 to receive a registration request from the computing device. The registration request may comprise a calculated representation of the pre-usage agreement.

At 650, instructions 115 cause processing resource 101 to validate the registration request. In some examples, and as described above, the validity determination may be based, at least in part, on the calculated representation and the identifier.

At 660, instructions 116 cause processing resource 101 to transmit a registration response to the computing device. In some examples, based on an invalid registration request, the registration response transmitted comprises a rejection notice. This lets the computing device know that registration is not allowed. In some examples, based on a valid registration request, the registration response transmitted comprises an acceptance notice. This lets the computing device know that registration is allowed.

Method 600 may include additional steps that are set by the wireless protocol being used by access device 100. For example, method 600 may include steps to authenticate the computing device to access device 100. As another example, method 600 may include steps described in relation to method 700.

Figure 7:
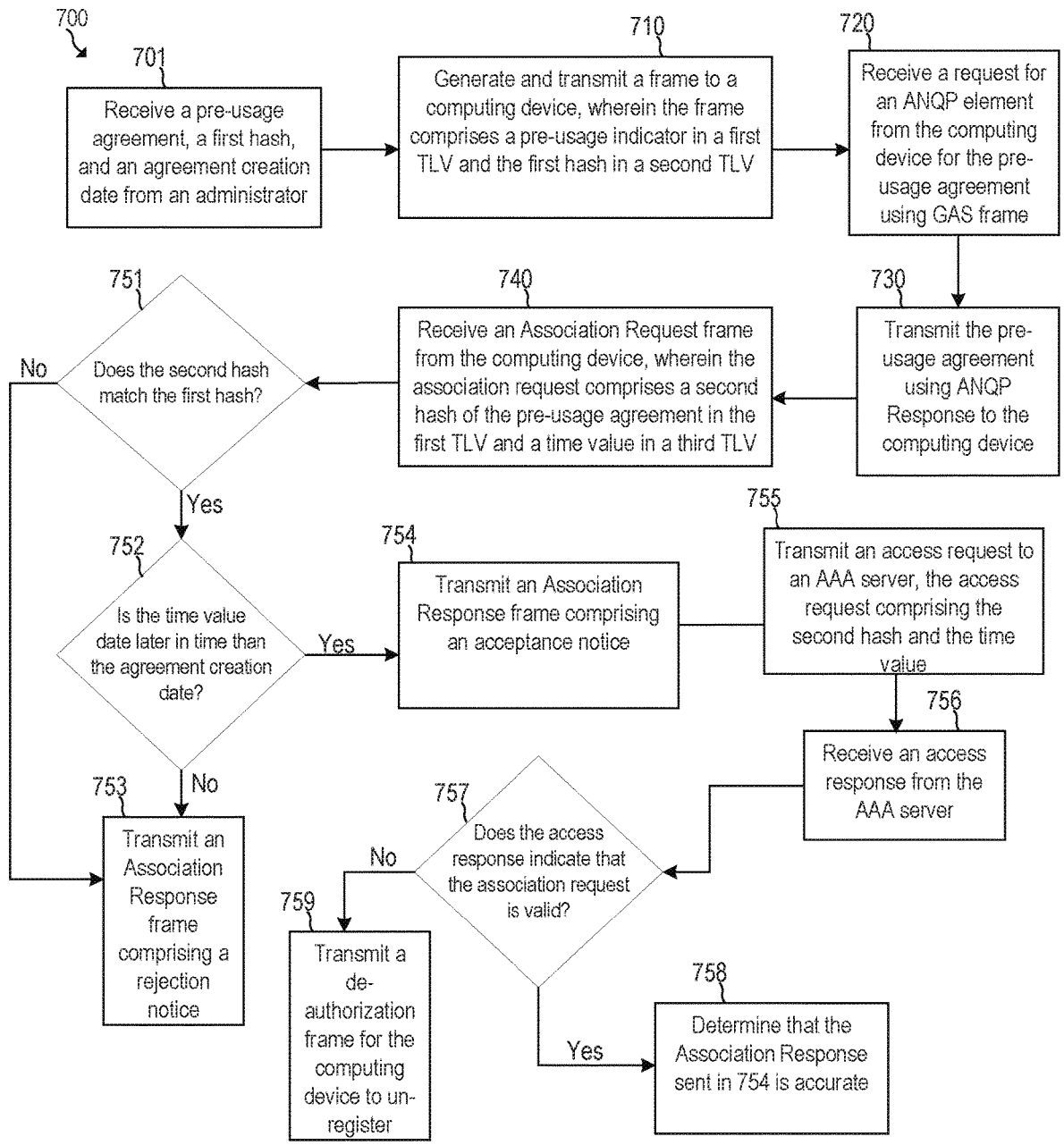
FIG. 7 is a flowchart of a method of transmitting a pre-registration agreement with an authentication, authorization, and accountability (AAA) server prior to association using local area network technology, according to some examples.

FIG. 7 illustrates a flowchart for a method 700 to transmit a pre-usage agreement prior to association and validate the agreement acceptance with an AAA server. FIG. 7 describes the method in terms of using local area network technology IEEE (e.g., 802.11, etc.). Although execution of method 700 is described below with reference to access device 400, other suitable devices for execution of method 700 can be utilized (e.g., access device 100 of FIG. 1 or access device 200 of FIG. 2).

At 701 of method 700, access device 400 receives a pre-usage agreement, an identifier of the pre-usage agreement, and an agreement creation date from an administrator. These items may be over the network that access device 400 is associated with. In some examples, as described above, the identifier may be a hash that is created by a one-way security function using the pre-usage agreement as an input. Access device 400 may store these items in memory 410. Because other hashes may be used (e.g., the hash for the calculated representation) in method 700, the identifier may be characterized as a "first" hash. The use of "first", "second", etc. herein denotes that these elements are separate items and may or may not coincide with the order in which they are generated or used.

At 710, first communication engine 401 generates and transmits a frame to computing device 430. This frame may be an "introductory" frame that is sent to let computing device 430 know that the network associated to access device 400 may be available to computing device 430. Non-limiting types of frames include a Beacon frame, a Probe Response frame, etc. The frame comprises the first hash received at 701 and a pre-usage indicator. In some examples, the first hash and the pre-usage indicator are stored in separate TLVs in the frame, each one designated for its specific value. The TLV for the first hash may be characterized as a "first" TLV and the TLV for the pre-usage indicator may be characterized as a "second" TLV. In other examples, the hash and the pre-usage indicator are stored in the same TLV.

At 720, second communication engine 402 receives a request for the pre-usage agreement from computing device 430. In some examples, this request may be over GAS Query for an ANQP element.

At 730, second communication engine 402 retrieves the pre-usage agreement 411 in memory 410 and transmits the agreement to computing device 430. In some examples, this is done using GAS response comprising the ANQP element.

At 740, first communication engine 401 receives an association request from computing device 430. The association request comprises a calculated representation of the pre-usage agreement 437 and a time value 438. In some examples, and as described above, the calculated representation may be a hash generated using a one-way security function with the pre-usage agreement as an input. This hash may be characterized as a "second" hash. The time value represents the date of when the user of computing device 430 read and/or accepted the pre-usage agreement.

In some examples, the request may be in a frame, specifically an Association Frame. Accordingly, the second hash and the time value may be stored in TLVs in the frame. In some examples, the second hash may be stored in the same TLV that stored the first hash (the first TLV, as described in step 710) and the time value 438 may be stored in a separate TLV that is characterized as a "third" TLV.

At 751 of method 700, validation engine 403 may compare the first hash to the second hash to determine whether they match. This is done as one way to validity the association request. Based on a determination that the first hash does not match to the second hash, method proceeds to 753. At 753, access device 400 transmits an Association Response frame to computing device 430 comprising a rejection notice. This denies the association request.

Based on a determination that the first hash matches the second hash, method proceeds to 752. At 752, validation engine 403 may determine whether the time value 438 indicates a date that is later in time than the agreement creation date. This is done as one way to validity the association request. Based on a determination that the date indicated by the time value is not later in time (e.g., earlier than the creation date, the same date as the creation date) the second hash, method proceeds to 753, as described above.

Based on a determination that the time value indicates a date that is later in time than the agreement creation date, method proceeds to 754. At 754, first communication engine 401 transmits an Association Response frame comprising an acceptance notice.

At 755, first communication engine 401 transmits an access request to an AAA server (not shown in FIG. 4). The access request may comprise the second hash and the time value. This may be done as an additional step of determining a validity of the association request (received at 740). For example, access device 400 has a version of the pre-usage agreement 410 along with the identifier 412 and creation date 413 associated with the pre-usage agreement 410. This version, however, may be updated periodically. In networks relying on an AAA server, the pre-usage agreement may be updated at the AAA server before being updated at the access devices. Accordingly, the version at access device 400 may be outdated. Thus, AAA server may also determine a validity of the association request.

At 756, first communication engine 401 may receive an access response from the AAA server. The access response may comprise an indication of whether the AAA server determined that the association request is valid or invalid.

At 757, first communication engine 401 determines whether the access response indicates that the association request is valid. Based upon a valid determination by the AAA server, method proceeds to 758. At 758, first communication engine 401 determines that the Association Response frame sent in 754 is accurate. However, based on an invalid determination by the AAA server, method proceeds to 759. At 759, first communication engine 401 transmits a de-authorization frame to computing device 430 to un-register computing device 430.

Method 700 may include additional steps that are set by the wireless protocol being used by access device 400. For example, method 700 may include steps to authenticate the computing device to access device 400. Additionally, in method 700, the identifier should be identical to the calculated representation. In other examples, and not shown in FIG. 7, the calculated representation is a derivation from the identifier. Accordingly, at 751 in those examples, validation engine 403 may determine whether the calculated representation have the expected relationships to the All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that when executed, cause a processing resource to:
   transmit a frame to a computing device, wherein the frame comprises an identifier of a pre-usage agreement for a network;
   receive a request for the pre-usage agreement from the computing device;
   in response to receiving the request for the pre-usage agreement, transmit the pre-usage agreement to the computing device;
   receive, from the computing device, a registration request comprising a calculated representation of the pre-usage agreement indicating an acceptance of the pre-usage agreement by a user associated with the computing device;
   validate the registration request; and
   transmit a registration response to the computing device.

2. The non-transitory machine-readable storage medium of claim 1, wherein the identifier is stored in a tag-length-value (TLV).

3. The non-transitory machine-readable storage medium of claim 1, wherein the frame comprises an indicator of a pre-usage requirement.

4. The non-transitory machine-readable storage medium of claim 3, wherein the indicator is stored in a TLV.

5. The non-transitory machine-readable storage medium of claim 1, wherein the identifier is a hash value.

6. The non-transitory machine-readable storage medium of claim 1, wherein the request for the pre-usage agreement is an Access Network Query Protocol (ANQP) element in a Generic Advertisement Service (GAS) frame.

7. The non-transitory machine-readable storage medium of claim 1, wherein the calculated representation is a hash value calculated by the computing device.

8. The non-transitory machine-readable storage medium of claim 1, wherein the instructions to validate the registration request comprises instructions, that when executed, cause the processing resource to compare the identifier to the calculated representation.

9. The non-transitory machine-readable storage medium of claim 1, wherein the registration request comprises a time value.

10. The non-transitory machine-readable storage medium of claim 9, wherein the instructions to validate the registration request comprises instructions, that when executed, cause the processing resource to compare the time value to an agreement creation date.

11. The non-transitory machine-readable storage medium of claim 9, comprising instructions to transmit the registration request to an authentication, authorization, and accountability (AAA) computing device.

12. A computing device comprising:
   a first communication engine to receive a frame from an access device;
      wherein the frame comprises a unique identifier of a pre-usage agreement for a network; and
      wherein the frame is received before the computing device registers with the access device;
   an agreement engine to present the network and an agreement requirement to a user and to receive a selection of the network from the user;
   a second communication engine to, in response to receiving the selection of the network, transmit a request for the pre-usage agreement to the access device and receive the pre-usage agreement from the access device;
   an acceptance engine to present the pre-usage agreement to the user and receive an acceptance indicator from the user;
   a calculation engine to, in response to receiving the acceptance indicator, determine a calculated representation of the pre-usage agreement;
   a memory to store the calculated representation; and
      wherein the first communication engine is to transmit a registration request comprising the calculated representation to the access device.

13. The computing device of claim 12, wherein the calculated representation is stored in a tag-length-value (TLV).

14. The computing device of claim 12, wherein the registration request comprises a time value representing a date of the acceptance indicator.

15. The computing device of claim 12, wherein the memory is to store a prior calculated representation associated with the network; and wherein the calculation engine is to compare the prior calculated representation with the unique identifier.

16. A method comprising:
   transmitting, by a processing resource of an access device, a frame to a computing device over a network, wherein the frame comprises an identifier of a pre-usage agreement in a tag-length-value (TLV);
   receiving, by the processing resource, a request from the computing device for the pre-usage agreement;
   in response to receiving the request for the pre-usage agreement, transmitting, by the processing resource, the pre-usage agreement to the computing device;
      wherein the transmission of the pre-usage agreement is before the computing device registers with the access device;
   receiving, by the processing resource, a registration request comprising a calculated representation of the pre-usage agreement;
   validating, by the processing resource, the registration request; and
   transmitting, by the processing resource, a registration response to the computing device.

17. The method of claim 16, wherein the validating of the registration request comprises comparing, by the processing resource, the unique identifier to the calculated representation.

18. The method of claim 16, wherein the registration request comprises a time value associated with an acceptance of the pre-usage agreement; and wherein the validating of the registration request comprises comparing, by the processing resource, the time value to an agreement creation date.

19. The method of claim 16, wherein the pre-usage agreement is transmitted using a GAS frame comprising an ANQP element.

* * * * *